(12) United States Patent
Koch

(10) Patent No.: US 10,773,432 B2
(45) Date of Patent: Sep. 15, 2020

(54) HOLLOW PROFILE COMPOSITE TECHNOLOGY

(71) Applicant: LANXESS Deutschland GmbH, Cologne (DE)

(72) Inventor: Boris Koch, Wermelskirchen (DE)

(73) Assignee: LANXESS Deutschland GmbH, Cologne (DE)

( * ) Notice: Subject to any disclaimer, the term of this patent is extended or adjusted under 35 U.S.C. 154(b) by 412 days.

(21) Appl. No.: 15/910,366

(22) Filed: Mar. 2, 2018

(65) Prior Publication Data
US 2018/0250855 A1 Sep. 6, 2018

(30) Foreign Application Priority Data

Mar. 3, 2017 (EP) ..................................... 17159057
Jul. 25, 2017 (EP) ..................................... 17182925

(51) Int. Cl.
| | |
|---|---|
| *B29C 45/14* | (2006.01) |
| *B23K 26/34* | (2014.01) |
| *B29C 49/06* | (2006.01) |
| *B29K 701/12* | (2006.01) |
| *B29L 31/30* | (2006.01) |
| *B29K 77/00* | (2006.01) |
| *B29K 309/08* | (2006.01) |

(52) U.S. Cl.
CPC ......... *B29C 45/1418* (2013.01); *B23K 26/34* (2013.01); *B29C 45/14311* (2013.01); *B29C 45/14467* (2013.01); *B29C 45/14598* (2013.01); *B29C 45/14778* (2013.01); *B29C 45/14836* (2013.01); *B29C 49/06* (2013.01); *B29K 2077/00* (2013.01); *B29K 2309/08* (2013.01); *B29K 2701/12* (2013.01); *B29L 2031/3002* (2013.01)

(58) Field of Classification Search
None
See application file for complete search history.

(56) References Cited

U.S. PATENT DOCUMENTS 2,814,350 A * 11/1957 Nelson .................. F04D 29/388
416/226
3,472,056 A * 10/1969 Gregg .................... B21D 7/066
72/369

(Continued)

FOREIGN PATENT DOCUMENTS

| DE | 4124021 C2 | 1/1993 |
| DE | 4330860 A | 3/1995 |

(Continued)

OTHER PUBLICATIONS

Wongpanit, Panya et al.: Effects of acrylic acid-grafted HDPE in HDPE-based binder on properties after injection and debinding in metal injection molding, Materials Chemistry and Physics, 147, p. 238-246, (2014).*

(Continued)

*Primary Examiner* — Matthew J Daniels
*Assistant Examiner* — Mohammad M Ameen
(74) *Attorney, Agent, or Firm* — Nicanor A. Kohncke

(57) ABSTRACT

The invention concerns a method for the production of a composite component from at least one hollow profile base element and at least one supporting element positioned in the interior of the at least one hollow profile base element.

18 Claims, 5 Drawing Sheets

(56) References Cited

U.S. PATENT DOCUMENTS

Figure 1:
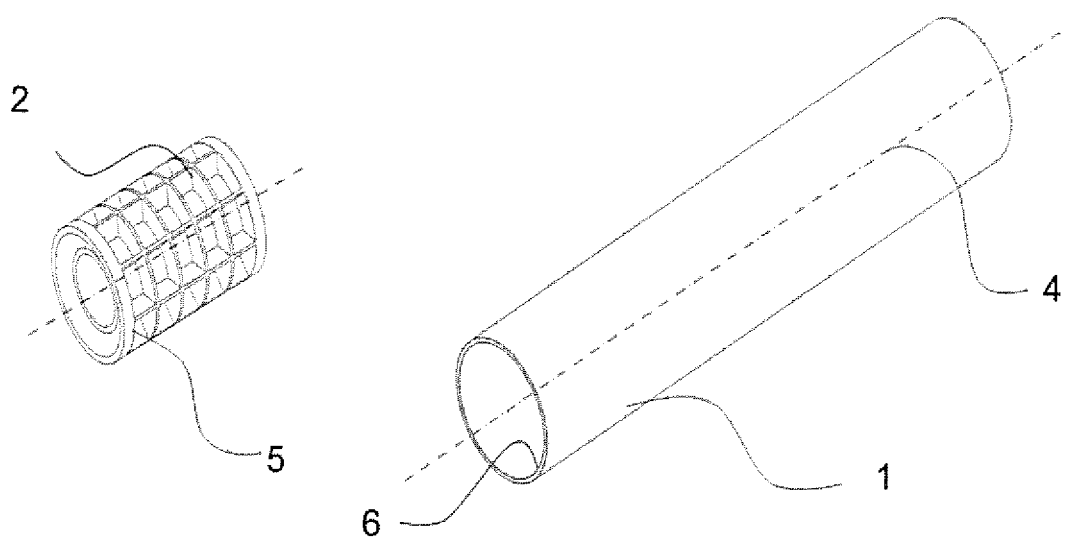

| | | | |
|---|---|---|---|
| 5,190,803 A | 3/1993 | Goldbach et al. | |
| 5,306,459 A | 4/1994 | Thomason et al. | |
| 5,934,744 A | 8/1999 | Jergens et al. | |
| 6,874,384 B1 * | 4/2005 | Freiwald | B21D 39/06 280/777 |
| 8,534,739 B2 | 9/2013 | Busuioc et al. | |
| 2003/0155694 A1 * | 8/2003 | Rowley | B29B 13/024 264/506 |
| 2004/0135285 A1 | 7/2004 | Brussel | |
| 2004/0206017 A1 | 10/2004 | Dajek et al. | |
| 2012/0189403 A1 * | 7/2012 | Billion Laroute | B29C 45/14836 411/432 |
| 2013/0092226 A1 | 4/2013 | Pawlik et al. | |
| 2015/0284035 A1 | 10/2015 | Reese | |
| 2016/0208142 A1 * | 7/2016 | Furuta | C09J 7/10 |

FOREIGN PATENT DOCUMENTS

| | | |
|---|---|---|
| DE | 10 2014 019 724 A1 * | 9/2015 |
| DE | 102014019724 A1 | 9/2015 |
| DE | 102014014296 A1 | 3/2016 |
| WO | 2006102047 A1 | 9/2006 |
| WO | 2009077026 A1 | 6/2009 |

OTHER PUBLICATIONS

European Search Report from corresponding European Application No. 18155544, dated May 3, 2018, two pages.

\* cited by examiner

HOLLOW PROFILE COMPOSITE TECHNOLOGY

The invention concerns a method for the production of a composite component from at least one hollow profile base element and at least one supporting element positioned in the interior of the at least one hollow profile base element.

In many cases, composite components are already in use today in motor vehicle construction. They are mostly produced from a metallic tubular profile or a metallic, closed hollow profile that is connected to at least one separately produced plastic element. The production of two separate components and finally the connection of these at least two components leads to increased expense of production and assembly. For connection of the tubular profile or hollow profile to the plastic element(s), additional connecting means in the form of screws, nuts, rivets or the like are also required, which in turn generally requires larger dimensions and leads to higher weight of the composite component.

Comparable composite components composed solely of plastic—i.e. both hollow profiles and elements composed of plastic—show lower strength and rigidity when their cross-sections are suitably dimensioned, but also have drawbacks in energy absorption on application of abrupt stress compared to similar components of metallic materials.

BACKGROUND OF THE INVENTION

DE 10 2014 019 724 A1 describes a method for the production of structural elements from a functional element and a fibre-plastic composite hollow profile in which local heating of the fibre-plastic composite hollow profile in the area of the undercut of a contour-defining element is carried out by optional selection of the sequence of insertion of the contour-defining element and insertion of a semi-finished structural element.

US 2012/0189403 A1 concerns a tapped insert to be produced by insert moulding that comprises a shank, at the axial ends of which flanges are provided that delimit two heads located opposite each other.

Means for axially blocking the insert in rotation after insert moulding and means for axially blocking the insert in translation after insert moulding are arranged on the outer side of the shank. The shank has at least one fusible area of greater axial deformability that is arranged between the axial threaded section and one of the axial end faces. The fusible area is configured such that an axial pressing force exerted on the axial end faces of the threaded insert presses said area into a relatively small axial longitudinal dimension without causing deformation of the axial threaded section.

WO 2009/077026 A1 describes a method for the production of a composite component from a hollow profile and an injection-moulded element, wherein the injection-moulded element is moulded onto the profile such that the profile is captively surrounded in the longitudinal direction, and wherein at least one positive-locking element is configured on the profile and is engaged in injection moulding application in that the positive-locking element lying between the ends of the profile is moulded in or out in a circumferential direction and a longitudinal direction.

The drawbacks of the solution presented in WO 2009/077026 A1 are the extremely complex and expensive methods involved on the one hand and the severely restricted design possibilities of the mechanical connections between the injection-moulded plastic component and the profile due to process-related considerations on the other.

According to WO 2009/077026 A1, an internal high-pressure forming method is first used in a combination tool before an injection moulding method is used to apply the injection-moulded element. Because of the successive combination of these two methods, first internal pressure and then injection moulding, in the same tool, this limits the minimum dimension of the wall thickness of the profile, which prevents reduction in weight in the sense of modern lightweight construction. Moreover, there are restrictions in the configuration of the connection site between the two components that finally result in a sharp reduction in the shear resistance and shear rigidity of the connection of the injection-moulded component to the profile. As the connection in WO 2009/077026 A1 is based on a positive-locking connection between the two components, said connection can be carried out only by circumferential moulding of the profile in the form of a ring—referred to in WO 2009/077026 A1 as a peripheral blade. The width of such a peripheral blade, however, is limited, and can only be a few millimetres, as this could otherwise result during the internal high-pressure forming process in undesirably high deformations of the profile wall and even to rupturing of the profile wall. According to WO 2009/077026 A1, an increase in the connection rigidity or connection strength of the profile and the injection-moulded component can therefore be achieved only by an arrangement of a plurality of such peripheral blades along the profile. In this case, a minimum distance of several millimetres must be maintained between two peripheral blades. This distance is generated in the tool by means of cores. If the width of these cores is too small, however, there is a risk of core failure and rupture of the profile, because during internal high pressure forming of the tube, the tube wall is both radially expanded and axially shifted on the cavity and the profile must therefore be supported over the largest possible area. According to WO 2009/077026 A1, only an average amount of at most 50% can be moulded onto a profile area X of 100%.

The object of the present invention was therefore to provide a method for the production of composite components in which a tolerance-sensitive, thin-walled hollow profile base element is introduced with sufficient clearance and free of resistance into an injection moulding or pressing tool, and in which nevertheless sealing of at least one cavity is achieved for a plastic melt to be applied to the hollow profile base element, and optionally its distribution around the hollow profile base element, with the applied plastic component also being connected to the exterior of the hollow profile base element without having its entire external shape deformed, thus producing an axial positive-locking composite component that is mechanically more rigid and more resistant to stress than those of the prior art.

Thin-walled within the meaning of the present invention preferably indicates a ratio of the diameter of a hollow profile to be used according to the invention to the wall thickness thereof in the range of 5:1 to 300:1.

Clearance within the meaning of the present invention means that the minimum dimension of the injection moulding or pressing tool cavity viewed perpendicular to the closing direction of the tool is always greater than, or in the borderline case equal to, the tolerance-sensitive external dimension of the hollow profile base element cross-section—likewise viewed perpendicular to the closing direction of the tools.

In addition, composite components to be produced according to the invention should not show the above-mentioned drawbacks in production or drawbacks in their resistance and rigidity properties, and thus in their energy absorption properties, and should allow a high degree of functional integration in the sense of system or module formation while allowing economical production.

INVENTION

The object is achieved by a method for the production of a composite component by
  a) provision of a pressing or casting tool with at least one cavity to be opened and a tool dimension A in the closing direction and a tool dimension B perpendicular to the closing direction,
  b) provision of at least one hollow profile base element with a ratio of diameter to wall thickness in the range of 5:1 to 300:1, whose external dimension C is greater by a range of 0.1 to 5% than tool dimension A and whose external dimension D is smaller by a range of 0.1 to 5% than tool dimension B, with the data on C and D referring to 90° viewed in the direction of the longitudinal axis of the hollow profile base element,
  c) provision of at least one supporting element, whose external dimension or external cross-sectional shape congruently corresponds to the internal dimension or the internal cross-sectional shape of the hollow profile base element,
  d) introduction and positioning of the at least one supporting element within the at least one hollow profile base element at the sites where the application of plastic will take place outside the hollow profile base element, and fixation thereof,
  e) insertion of the hollow profile base element containing at least one supporting element into the at least one cavity of the injection moulding or pressing tool,
  f) closing of the at least one cavity of the injection moulding or pressing tool and pressing of the hollow profile base element in the closing direction of the at least one cavity,
  g) external application of plastic in the form of a melt to the hollow profile base element and deformation of the hollow profile base element,
  h) cooling of the plastic melt applied to the hollow profile base element in g) (solidification), and
  i) removal of the finished composite component from the injection moulding tool.

Surprisingly, the method according to the invention allows the production of composite components from a hollow profile base element with an externally applied plastic component in an injection moulding or pressing tool, without using a tool-technology-related operation or using internal pressure in order to achieve a seal between the tolerance-sensitive hollow profile base element to be used according to the invention and the injection moulding or pressing tool, but also while providing sufficient support so that the externally applied plastic component is connected to the hollow profile base element in a positive-locking, shear-resistant and shear-rigid manner, in that of an external surface section of the hollow profile base element of X=100%, more than 50%, preferably 75 to 100%, and particularly preferably 90 to 100%, is bonded with plastic, preferably through application by injection moulding, circumferential moulding, overmoulding, pressing on or pressing around.

The present invention therefore also concerns a composite component containing at least one base element having a hollow profile cross-section—referred to below as the hollow profile base element—and at least one plastic element connected to the hollow profile base element at discrete connection sites in a positive-locking manner, as well as at least one supporting element positioned inside the hollow profile base element at the discrete connection sites of the at least one externally applied plastic element, with the hollow profile base element having a diameter/wall thickness ratio in the range of 5:1 to 300:1.

In an embodiment, the present invention concerns a composite component obtainable by
  a) provision of a pressing or casting tool with at least one cavity to be opened and a tool dimension A in the closing direction and a tool dimension B perpendicular to the closing direction,
  b) provision of at least one hollow profile base element with a ratio of diameter to wall thickness in the range of 5:1 to 300:1, whose external dimension C is greater by a range of 0.1 to 5% than tool dimension A and whose external dimension D is smaller by a range of 0.1 to 5% than tool dimension B, with the data on C and D referring to 90° viewed in the direction of the longitudinal axis of the hollow profile base element,
  c) provision of at least one supporting element, whose external dimension or external cross-sectional shape congruently corresponds to the internal dimension or the internal cross-sectional shape of the hollow profile base element,
  d) introduction and positioning of the at least one supporting element within the at least one hollow profile base element at the sites where the application of plastic will take place outside the hollow profile base element, and fixation thereof,
  e) insertion of the hollow profile base element containing at least one supporting element into the at least one cavity of the injection moulding or pressing tool,
  f) closing of the at least one cavity of the injection moulding or pressing tool and pressing of the hollow profile base element in the closing direction of the at least one cavity,
  g) external application of plastic in the form of a melt to the hollow profile base element and deformation of the hollow profile base element by the injection pressure or pressing force,
  h) cooling of the plastic melt applied to the hollow profile base element in g) (solidification), and
  i) removal of the finished composite component from the injection moulding tool.

Although the supporting elements according to the invention must be produced in a preceding step, these do not require any additional construction space—as they are positioned inside the at least one hollow profile base element. The fact that the supporting element or supporting elements remain(s) inside said base element can initially result in additional weight of the final product—the composite component—, but this results at the end of the process in a lighter weight, more particularly if hollow profile base elements with lower wall thicknesses can therefore be used, or, however, if supporting element(s) can be removed from the hollow profile base element subsequently, more particularly by melting out.

According to the invention, the shape or structuring of the wall of the hollow profile base element generated by the method of the invention and thus the wall of the connecting surface of the two components of the composite component can be defined or controlled by the configuration of the at least one supporting element. A positive-locking connection/interlinking of the hollow profile base element and the moulded-on plastic is additionally supported by the blocking of all degrees of freedom, translationally in the X, Y and Z direction and rotationally about the X, Y, and Z axis, thus providing a shear-resistant and shear-rigid connection at least in the axial direction, and preferably in the axial and radial direction, with respect to the hollow profile base element.

After method step i), if one removes in an additional method step j) the at least one supporting element from the interior of the hollow profile base element, one obtains in an embodiment of the present invention composite components without supporting element(s).

It should be noted for purposes of clarity that all definitions and parameters mentioned either in general or in preferred ranges are included in any desired combinations. Standards cited within the framework of this application shall apply in the respective version valid on the filing date.

Pressing according to method steps d), e) and f) means deformation in which no circumferential expansion, but only a change in shape is produced. In the case of a tolerance-related excess dimension of the circumference of the profile, a change in shape is also mainly produced, but towards the end of the final movement of the tool, there will be a slight decrease in circumference.

Shear resistance is a material constant that describes the resistance of a material to shearing, i.e. to separation by forces tending to longitudinally shift two surfaces in contact with each other. The shear resistance is determined by the shear modulus, also referred to as the modulus of rigidity. Within the meaning of the present invention, a shear resistant connection means a shear-rigid, positive-locking connection in the axial direction, preferably in the axial and radial direction, of the hollow profile base element to at least one plastic element applied to the hollow profile base element.

The shear rigidity is the product of the shear modulus G of a material and the cross-sectional area A. The following applies:

$$\text{shear rigidity} = G \cdot A - \kappa (= G \cdot A_s)$$

Here, the cross-section-dependent correction factor $\kappa$ takes into account the non-uniform distribution of the shear stress T over the cross-section. Shear rigidity is often also expressed by means of shear area $A_s$. See: https://de.wikipedia.org/wiki/Steifigkeit.

Positively-locking connections within the meaning of the present invention take place by the engagement of at least two connection partners, which enter into a non-detachable connection with each other and can only be separated from each other by destruction. See: https://de.wikipedia.org/wikiNerbindungstechnik.

PREFERRED EMBODIMENTS OF THE INVENTION

In a preferred or alternative embodiment, during or after method step d), at least one crimp, and preferably a plurality of crimps, are made in the wall of the hollow profile base element in the area of the at least one supporting element, preferably at the exact position of the at least one supporting element.

In a preferred or alternative embodiment, before, during or after method step b), at least one hole or one bore, preferably a plurality of holes or bores, is/are made in the wall of the hollow profile base element in the area of the at least one supporting element, preferably at the exact position of the at least one supporting element.

In a preferred or alternative embodiment, during or after method step d), at least one hole or bore, preferably a plurality of holes or bores, is/are made in the hollow profile base element in the area of the at least one supporting element, preferably at the exact position of the at least one supporting element.

In the three latter embodiments, deformation of the wall of the hollow profile base element by injection moulding as described in method step g) is no longer necessary in order to generate a positive-locking, shear-resistant and shear-rigid connection in at least the axial direction of the hollow profile base element, preferably in the axial and radial directions of the hollow profile base element, between the hollow profile base element and the plastic application, preferably the plastic moulding or pressing application.

A hollow profile base element to be used according to the invention can therefore have both a plurality of crimps and a plurality of holes or bores.

In a further preferred or alternative embodiment, after method step d) and before method step e), at least one plastic melt volume is deposited in at least one cavity provided for this purpose in the injection moulding tool or pressing tool, and in method step f), by closing of the injection moulding or pressing tool, the plastic melt volume is locally compressed and pressed from outside against the wall of the hollow profile base element and simultaneously against the at least one supporting element positioned in the hollow profile base element or pressed around the hollow profile base element.

In a further preferred or alternative embodiment, after method step h), in the case of a metallic hollow profile base element, an additional internal high pressure forming (IHPF) method for changing the shape of the hollow profile base element is used at the sites where there is no supporting element and no plastic coating. See: htttps://de.wikipedia.org/wiki/Innenhochdruckumformen.

In a further preferred or alternative embodiment, after method step i), in the case of a hollow profile base element of plastic, an additional blow-moulding process for changing the shape of the hollow profile base element is used at the sites where there is no supporting element and no plastic coating.

In a further preferred or alternative embodiment, after method step i), the hollow profile base element is deformed at at least one site by application of additional bending forces at sites where there is no supporting element and no plastic coating. Preferably, additional bending forces are applied if the final component shape deviates from that of a straight hollow profile base element.

In a further preferred or alternative embodiment, after method step d) and before method step e), the hollow profile base element is deformed at at least one position by application of additional bending forces. This deformation can be carried out outside the tool at any desired site of the hollow profile base element. Preferably, additional bending forces are applied if the final component shape deviates from that of a straight hollow profile base element. The deformation can be carried out both at sites where a supporting element is located inside the hollow profile base element and at sites where there is no supporting element in the interior of the hollow profile base element. If the bending is carried out in the area of the site of a supporting element, the supporting element can support the hollow profile wall and keep the cross-sectional shape at this site only slightly deformed.

In a further preferred or alternative embodiment, the connection of the hollow profile base element and the moulded-on plastic is additionally supported by the blocking of all degrees of freedom, translationally in the X, Y and Z direction and rotationally about the X, Y, and Z axis, by means of surface treatment of the external wall of the hollow profile base element. This surface treatment is preferably carried out before at least one of method steps b), c), d) or e).

Preferred forms of the surface treatment are the application of at least one bonding agent, plasma surface activation, laser structuring, chemical pretreatment or an additive application method.

Preferred chemical pretreatment means are the use of acids or bases. The preferred additive application method is the thermal metal injection moulding application method. See: https://de.wikipedia.org/wiki/Thermisches_Spritzen.

Method Step a)

Method step a) concerns the preparation of a pressing or casting tool with at least one cavity to be opened and a tool dimension A in the closing direction and a tool dimension B perpendicular to the closing direction of the tool. The closing direction refers according to the invention to the pressing or injection moulding tool to be used. Preferably, a moulding or pressing tool to be used according to the invention has two tool halves. Depending on the configuration of the composite component to produced, however, the tool halves may also consist of a plurality of segments. The person skilled in the art will adapt the design of the injection moulding or pressing tools to be used according to the composite component to be produced. A summary of injection moulding or pressing tools to be used according to the invention and the manufacturers thereof can be found, among other sources, in W. Michaeli, G. Menges, P. Mohren, Anleitung zum Bau von Spritzgieβwerkzeugen [Guide to the Construction of Injection Moulding Tools, $5^{th}$ fully-revised edition, Carl Hanser Verlag Munich Vienna 1999 (English Edition 2001).

Preferably, an injection moulding or pressing tool to be used according to the invention has the following features so that it can be used to insert, without force, a hollow profile base element with all of its dimensional and shape tolerances into the pressing or injection moulding tool:

I. The injection moulding or pressing tool must be configured such that on closing of the tool, it seals off the injection moulding or pressing cavities from the areas of the hollow profile base element in which, in method step g), no application of plastic will take place. For this purpose, contact surfaces in the injection moulding or pressing tool are required at the axial ends of the injection moulding or pressing cavities that press the hollow profile base element during closing of the tool from its hollow profile base element external dimension C to tool dimension A, which at the same time causes the hollow profile base element external dimension D to change to tool dimension B.

II. In an embodiment, the contact surfaces of the at least two tool halves with the hollow profile base element in the injection moulding or pressing tool are configured such that the hollow profile base element is additionally pressed beyond the extent described in I. into a mould by a range of −0.01 to −1% of tool dimension A and tool dimension B.

III. The contact surfaces of the at least two tool halves in the injection moulding or pressing tool mentioned in I. and II. comprise the hollow profile base element when the tool is closed over its entire circumference and preferably have a width, i.e., an extension viewed in the axial direction of the hollow profile base element, in the range of 1.0 to 10.0 mm.

IV. In an embodiment, the contact surfaces of the at least two tool halves with the hollow profile base element in the injection moulding or pressing tool are configured such that these areas in the tool constitute hardened inserts. Preferably, the hardened inserts have a Rockwell hardness in the range of 50 to 62. This hardness thus lies in the range of conventional bending and punching tools.

See: https://de.wikipedia.org/wiki/Rockwell_(Einheit).

V. The injection moulding or pressing tool must have a clearance around the hollow profile base element between its contact surfaces outside the injection moulding or pressing cavities. This clearance preferably is or lies in the range of 1.0 to 10.0 mm.

Method Step b)

In method step b), at least one hollow profile base element with a ratio of diameter to wall thickness in the range of 5:1 to 300:1, whose hollow profile base element external dimension C is greater by a range of 0.1 to 5% than tool dimension A of the cavity and whose hollow profile base element external dimension D is smaller by a range of 0.1 to 5% than tool dimension B of the cavity, is provided. According to the invention, the data on the hollow profile base element external dimensions C and D of the hollow profile base element to be provided in b) refer to 90° viewed in the direction of the longitudinal axis of the hollow profile base element.

Preferably, the data on the hollow profile base element external dimensions C and D refer to the site(s) of local pressing mentioned in f) on the hollow profile base element to be provided in method step b) at which the axial ends of the at least one supporting element to be provided in method step c) and to be inserted into and positioned in the hollow profile base element in method step d) are located.

A hollow profile base element to be used according to the invention can be produced according to various methods, have various cross-sectional shapes and be composed of various materials. Preferably, at least one of the techniques of extrusion moulding, drawing, extrusion, blow moulding, injection moulding, seamless drawing, longitudinal welding, spiral welding, winding, and pultrusion is used for the production thereof. In this case, a thin-walled hollow profile base element to be used according to the invention can have a circular, elliptical, or a polygonal cross-section—triangular, quadrangular, pentagonal, etc.—up to a cross-section having a multitude of angles.

Preferably, a hollow profile base element to be provided in method step b) has a wall thickness in the range of 0.1 to 10.0 mm. A hollow profile base element to be used according to the invention preferably has at least two openings, one on each of the end faces.

Preferably, for the production of the hollow profile base element to be used according to the invention, at least one material from the group of metals, alloys, thermoplastics and duroplasts is used.

Preferred metals are steel, aluminium, magnesium, titanium, tin, zinc, lead, silver, gold, brass or alloys. Preferred thermoplastics are polyamides (PA), polyethylene terephthalates, polyethylene (PE), polypropylene (PP) and polyvinylchloride (PVC). Particularly preferably, as a thermoplastic for the hollow profile base element to be used according to the invention, polyamide or polyalkylene terephthalate is used. As a polyamide, a polyamide 6 is preferably used. As a polyalkylene terephthalate, polybutylene terephthalate (PBT) or polyethylene terephthalate, more particularly PBT, is preferably used. Preferred duroplasts are epoxy resins, crosslinkable polyurethanes or unsaturated polyester resins.

Particularly preferably, a hollow profile base element to be prepared in method step b) is produced from a thermoplastic with at least one filler or reinforcing material. Glass fibres are preferably used as a filler or reinforcing material. Particularly preferably, filler or reinforcing materials are used in amounts in the range of 0.1 to 85 parts by mass per 100 parts by mass of the thermoplastic.

Particularly preferably, in the case of plastic-based hollow profile base elements, those composed of a glass fibre-reinforced polyamide 6 with 15 to 60 parts by mass of glass fibres per 100 parts by mass of polyamide are preferably produced in the injection moulding process.

Particularly preferably, in the case of metal-based hollow profile base elements, those composed of aluminium or steel, more particularly steel, are used.

According to the invention, metal tubes in the form of a hollow cylinder are preferably used as the hollow profile base element.

Polyamides (PA) to be used for the hollow profile base element wall can be synthesized from various building blocks and produced by various methods. In the case of a special application, the polyamide to be used for this purpose may be used alone or may be equipped in a manner known to the person skilled in the art with materials having a specifically determined combination of properties. Also suitable are PA blends with portions of other polymers, preferably with portions of polyethylene, polypropylene or acrylonitrile-butadiene-styrene copolymer (ABS), wherein optionally one or a plurality of compatibilizers can be used to compensate for the phase heterogeneity occurring in such blends. The properties of the polyamides may be improved as needed by adding elastomers.

A plurality of processes for the production of polyamides are known, wherein depending on the desired final product, various monomer building blocks or various chain regulators may be used to adjust the desired molecular weight, or monomers with reactive groups may also be used for subsequent planned post-treatments.

A polyamide preferred for use is produced by polycondensation in the melt, wherein in the context of the present invention, the hydrolytic polymerization of lactams is also understood to be polycondensation.

Polyamides preferred according to the invention for use in the hollow profile base element wall range from diamines and dicarboxylic acids and/or lactams with at least 5 ring members or corresponding amino acids. Suitable preferred reactants include aliphatic and/or aromatic dicarboxylic acids, particularly preferably adipic acid, 2,2,4-trimethyladipic acid, 2,4,4-trimethyladipic acid, azelaic acid, sebacic acid, isophthalic acid, terephthalic acid, aliphatic and/or aromatic diamines, particularly preferably tetramethylene diamine, hexamethylene diamine, 1,9-nonane diamine, 2,2,4- and 2,4,4-trimethylhexamethylene diamine, the isomers diaminodicyclohexylmethane, diaminodicyclohexylpropane, bis-aminoethyl-cyclohexane, phenylene diamines, xylylene diamines, aminocarboxylic acids, more particularly aminocaproic acid, or the corresponding lactams. Copolyamides of a plurality of the cited monomers are included.

Particularly preferably, polyamide composed of lactams is used for the hollow profile base element wall, with caprolactams being particularly preferred for this purpose, most particularly preferably ε-caprolactam.

Polyamide produced by activated anionic polymerization or copolyamide produced by activated anionic polymerization with polycaprolactam as the main component can also be used according to the invention. The activated anionic polymerization of lactams to polyamides is carried out on an industrial scale in such a way that one can produce a solution of a catalyst in lactam, optionally with an impact modifier, on the one hand and a solution of an activator in lactam on the other, with both solutions ordinarily being composed such that addition of them together in the same ratio yields the desired total formulation. Further additives can optionally be added to the lactam melt. The polymerization takes place by mixing of the individual solutions into the total formulation at temperatures in the range of 80° C. to 200° C., preferably at temperatures in the range of 100° C. to 140° C. Suitable lactams include cyclic lactams with 6 to 12 C atoms, preferably laurolactam or ε-caprolactam, particularly preferably ε-caprolactam. The catalyst is an alkali or alkaline earth metal lactam, preferably as a solution in lactam, particularly preferably sodium caprolactam in ε-caprolactam. Examples of suitable activators for use within the meaning of the invention can be N-acyllactams or acid chlorides, or preferably, aliphatic isocyanates, particularly preferably oligomers of hexamethylene diisocyanate. As an activator, one may use both the pure substance, or more preferably a solution, preferably in N-methylpyrrolidone.

Particularly suitable for the hollow profile base element wall are polyamides with a relative solution viscosity in m-cresol in the range of 2.0 to 4.0, preferably in the range of 2.2 to 3.5, and most preferably in the range of 2.4 to 3.1. The indications on relative solution viscosity $\eta_{rel}$ are given in the context of the present invention according to EN ISO 307. The ratio of the outflow time t of the polyamide dissolved in in m-cresol to the outflow time t(0) of the solvent m-cresol at 25° C. yields the relative solution viscosity according to the formula $\eta_{rel}=t/t(0)$.

Polyamides with a number of amino end groups in the range of 25 to 90 mmol/kg, preferably in the range of 30 to 70 mmol/kg, and particularly preferably in the range of 35 to 60 mmol/kg are also particularly well suited for the hollow profile base element. The determination of the amino end groups can be carried out by conductimetry. See: Eidgenössische Materialprüfungs- and Versuchsanstalt for Industrie, Bauwesen and Gewerbe [Swiss Federal Materials Testing and Experimental Institute for Industry, Civil Engineering, and Trade], Zülrich/St. Gallen, Dr. W. Schefer, Report No. 157, 1954.

Even more preferably, partially crystalline polyamides or compounds based thereon as matrix polymers are used for the hollow profile base element. According to DE 10 2011 084 519 A1, partially crystalline polyamides possess a melting enthalpy in the range of 4 to 25 J/g, measured by the DSC method according to ISO 11357, 2. Heating and Integration of the Melting Peak. In contrast to this, amorphous polyamides have a melting enthalpy of less than 4 J/g, measured by the DSC method according to ISO 11357, 2. Heating and Integration of the Melting Peak.

According to the invention, polyimide to be used for the hollow profile base element wall is available as PA6 [CAS No. 25038-54-4] or as PA66 [CAS No. 32131-17-2] from Lanxess Deutschland GmbH, Cologne, under the trade name Durethan®.

In an embodiment, at least PE is used for the hollow profile base element wall as a thermoplastic. Polyethylene [CAS No. 9002-88-4] is a partially crystalline and non-polar thermoplastic. Based on the polymerization conditions selected, molecular weight, molecular weight distribution, mean chain length, and degree of branching can be adjusted. According to the differences in density, a distinction is made among four main types, the abbreviations for which are not always used uniformly:

high-density polyethylene, PE-HD or HOPE
medium-density polyethylene, PE-MD or MOPE
low-density polyethylene, PE-LD or LOPE
linear, low-density polyethylene, PE-LLD or LLDPE.

According to the invention, HDPE or LDPE are most particularly preferred.

In an embodiment, at least PP is used for the hollow profile base element wall as a thermoplastic. PP [CAS No. 9003-07-0] is a partially crystalline thermoplastic and belongs to the group of the polyolefins. Polypropylene is obtained by polymerization of the monomer propene using a catalyst.

In an embodiment, at least PC is used for the hollow profile base element wall as a thermoplastic. Particularly preferably, polycarbonates based on 2,2-bis(4-hydroxyphenyl)-propane (Bisphenol A), bis(4-hydroxyphenyl)sulfone (Bisphenol 5), dihydroxydiphenylsulfide, tetramethylbisphenol A, 1,1-bis(4-hydroxyphenyl)-3,3,5-trimethylcyclohexane (BPTMC) or 1,1,1-tris(4-hydroxyphenyl)-ethane (THPE) are used. Particularly preferably, PC based on Bisphenol A is used. According to the invention, PC to be used is available for example under the trade name Makrolon® from Covestro AG, Leverkusen.

In an embodiment, at least PBT is used for the hollow profile base element wall as a thermoplastic [CAS No. 24968-12-5]. PBT is produced by polycondensation of the intermediate product bis(4-hydroxybutyl)terephthalic acid ester. The latter substance can be produced by esterification of 1,4-butane diol and terephthalic acid or by catalytic transesterification of dimethyl terephthalate with 1,4-butane diol in the presence of transesterification catalysts such as tetraisopropyl titanate. PBT to be used with particular preference contains at least 80 mol. %, preferably at least 90 mol. %, relative to the dicarboxylic acid, of terephthalic acid radicals and at least 80 mol. %, preferably at least one 90 mol. %, relative to the diol component, of butane diol-1,4-glycol radicals. PBT to be used according to the invention is available for example under the trade name Paean® from Lanxess Deutschland GmbH, Cologne.

In an embodiment, at least PET is used for the hollow profile base element wall as a thermoplastic. PET [CAS No. 25038-59-9] is a thermoplastic polymer produced by polycondensation from the family of the polyesters based on the monomers ethylene glycol and terephthalic acid. PET to be used with particular preference contains at least 80 mol. %, preferably at least 90 mol. %, relative to the dicarboxylic acid, of terephthalic acid radicals and at least 80 mol. %, preferably at least 90 mol. %, relative to the diol component, of ethylene glycol radicals. PET is available for example from Ticona GmbH, 65843 Sulzbach.

In an embodiment, PVC is used for the hollow profile base element wall as a thermoplastic [CAS No. 9002-86-2]. As an amorphous thermoplastic, PVC is hard and brittle, and can only be made soft, mouldable, and suitable for technical applications by the addition of softeners and stabilizers. PVC is known through its use in flow coverings, window profiles, tubes, cable insulations and casings, and in records. According to the invention, hard PVC (PVC-U) is preferably used, such as the type commonly used for tubes and profiles. Hard PVC tubes as hollow profile base elements are available for example from ThyssenKrupp Plastics Germany, Cologne.

Method Step c)

Method step c) concerns the preparation of at least one supporting element, whose external dimension or external cross-sectional shape congruently corresponds to the internal dimension or the internal cross-sectional shape of the hollow profile base element. More preferably, method step c) is carried out with the proviso that the circumference of the hollow profile base element does not undergo any expansion.

In method step c), congruently means that the shape and the dimensions of the surfaces of a supporting element facing outwards correspond as far as possible to the shape and the dimensions of the surfaces of a hollow profile base element facing inwards to be used according to the invention. In this manner, the internal surface of a hollow profile base element to be used according to the invention and the external surface of a supporting element to be used according to the invention are at equal distances from each other along their entire contact surface(s). Preferred are supporting elements that correspond as much as possible to the internal shape of a hollow profile base element to be used according to the invention on all sides and show a structure that is approximately congruent to the internal wall of the hollow profile base element.

Preferably, the congruency concerns the internal dimension or the internal cross-sectional shape of the at least one hollow profile base element provided in b).

Approximately equal distances mean production tolerance-related deviations in congruency in the range of −1.5 to +3% between the external dimension or the external cross-sectional shape of a supporting element and the internal dimension or the internal cross-sectional shape of a hollow profile base element to be used according to the invention.

The special shape or configuration of a supporting element is of the utmost importance for the production of the composite between a thin-walled hollow profile base element and a plastic component preferably to be applied by means of injection moulding or pressing in method step g). A supporting element to be used according to the invention is used primarily for internal support of the thin hollow profile base element wall.

Without the use of at least one supporting element, a thin-walled hollow profile base element to be used according to the invention would be compressed by the injection pressure or pressing force of the injection moulding method or pressing method to be used in method step g). A supporting element to be used according to the invention must be present in a shape or configuration adapted to the internal cross-section of a hollow profile base element to be used as described in method step c). As the person skilled in the art is familiar with the shape and configuration of a hollow profile base element to be provided in method step b) based on the subsequent object of the composite component, said person will provide correspondingly suitable supporting elements in method step c).

With respect to the design, the material, and other configuration features of a separating element to be provided in method step c), the person skilled in the art will orient himself based on the three objects of a supporting element:

1. supporting elements to be used support the hollow profile base element wall to prevent collapsing of the hollow profile cross-section during the plastic application in method step g) and in the area of the plastic to be applied;
2. supporting elements to be used in a sense constitute the negative shape for the forming area of the hollow profile base element wall in the area of the plastic to be applied in method step g);
3. optionally, supporting elements serve as supports for the surfaces of the hollow profile base element wall at the site(s) where the axial ends of a supporting element positioned in the hollow profile base element are located, and serve to seal the cavity of the plastic to be applied. Depending on the material of the hollow profile base element wall, however, the inherent support provided by these support elements may already be sufficient.

A supporting element to be provided in method step c), however, also serves as a counter-bearing to a structured wall of the hollow profile base element that is produced by the injection pressure or pressing force of the plastic component.

A supporting element to be used according to the invention is preferably to be positioned exactly at the site in the interior of a hollow profile base element at which the application of the plastic component to the external wall of the hollow profile base element takes place in method step g). Preferably, this application is carried out by injection moulding, circumferential moulding, overmoulding, pressing on or pressing around.

A supporting element to be used according to the invention is preferably configured as follows:

1. it allows fixation of the hollow profile base element in method step d) by local external application of force of the pressing tool or the injection moulding tool, preferably to the hollow profile base element outer wall, and/or bending of the hollow profile base element and supports the hollow profile base element in such a way that it does not buckle during bending;
2. it builds up sufficient counterpressure during closing of the injection moulding tool or the pressing tool and ensures sealing of the injection moulding cavity; optionally in this case, it supports the surfaces of the hollow profile base element wall at the position or at the sites where the axial ends of the at least one supporting element positioned in the hollow profile base element are located, and which serve to seal the cavity of the applied plastic, provided that its own intrinsic supporting action of the hollow profile base element wall is not sufficient;
3. it ensures sufficient stability of the thin-walled hollow profile base element during the injection moulding process of the thermoplastic and prevents compression of the cross-section of the hollow profile base element, preferably the tubular cross-section of the hollow profile base element (main function);
4. it has a structure such that local deformations of the thin-walled hollow profile base element can be achieved by means of the injection pressure or pressing force of the thermoplastic melt, or by means of a preceding pressing step using solid stamps;
5. it generates a deformation as described in 4, in such manner that ultimately, after application of the plastic component to the external wall of the hollow profile base element, preferably in the form of injection moulding application, circumferential moulding, pressing on or pressing around, by means of said plastic component, a rigid, high-strength, and long-lasting positive-locking connection between the hollow profile base element and the plastic component is produced; and
6. it has as low a weight as possible in the range of 1 to 1000 g and is economical for cases in which the supporting element remains in the hollow profile after method step i).

In the preferred case, in which the hollow profile base element has the shape of a tube or a tubular shape having an elliptical cross-section with a small hollow profile base element external dimension D and a large hollow profile base element external dimension C, at least one cylindrical supporting element having an equally elliptical cross-section is preferably positioned in the interior of the hollow profile base element.

In the event that the method according to the invention is combined with an IHPF method, supporting elements with a through hole that allows flow in an IHPF method of the fluid used through a supporting element are preferably to be used in method step c). In the case of a tubular hollow profile base element, cylindrical supporting elements having a bore along their axis, so-called hollow cylinders, are preferably used.

A supporting element to be used according to the invention can be produced by various methods and consist of various materials. The preferred techniques to be used for the production of supporting elements to be used according to the invention are punching, deep drawing, interconnecting, welding, soldering, riveting, casting, die casting or injection moulding.

For the production of the supporting element to be used according to the invention, at least one material from the group of metals, thermoplastics, duroplasts and ceramics is preferably used. Preferred metals are steel, aluminium, magnesium, titanium, tin, bismuth, brass or other allows.

Particularly preferably, a supporting element to be provided in method step c) is produced from a thermoplastic. Particularly preferably, a polyamide or a polyester is used as the thermoplastic. A polyamide 6 is preferably used as a polyamide. A polyalkylene terephthalate is preferably used as a polyester, particularly preferably polybutylene terephthalate.

Even more preferably, a supporting element to be provided in method step c) is produced from a thermoplastic with at least one filler or reinforcing material. Glass fibres are preferably used as a filler or reinforcing material. Particularly preferably, 0.1 to 85 parts by mass of the filler or reinforcing material are used per 100 parts by mass of the thermoplastic. According to the invention, supporting elements based on thermoplastics to be used are preferably produced by injection moulding in a step preceding the method according to the invention.

Particularly preferably, a supporting element to be provided in method step c) is produced in the injection moulding process from a glass fibre-reinforced polyamide 6 with 15 to 60 parts by mass of glass fibres per 100 parts by mass of polyamide.

In cases where a supporting element to be provided in method step c) is to be removed from the composite component after it is produced, such supporting elements are melted out after completion of method step i) in a further method step j). In this case, low melting point metals or alloys are preferably used for the production of suitable supporting elements which withstand the method according to the invention, but are subsequently liquefied by higher temperatures, preferably by the action of temperatures in the range of 80 to 220° C., and can then be removed from the hollow profile base element. A supporting element to be used for this purpose is composed of a metal or an alloy that has a melting point below the melting point of the plastic to be applied or used in method step g). Tin-bismuth alloys are preferably used. DE 4124021 C2 discloses a tin-bismuth allow having a melting point of 138° C.

Supporting elements based on thermoplastics to be used according to the invention are produced by injection moulding in a step prior to the method according to the invention.

In an embodiment, the at least one supporting element can be a plastic-metal hybrid, preferably a cylindrical metal tube with sprayed on plastic ribs. Plastic-metal hybrid technology is known to the person skilled in the art, for example from EP 0 370 342 A1.

Method Step d)

In method step d), the introduction and the exact positioning of a supporting element provided in method step c) are carried out inside the at least one hollow profile base element at the sites where the application of the plastic in method step g) will take place.

In this case, various methods of introduction of a supporting element are conceivable. In the case of use of a plurality of supporting elements, these are preferably slid or pressed together or successively into the hollow profile base element prepared in method step b, preferably a metal tube.

In an embodiment, fixation of a supporting element and thus fixation of the subsequent plastic/hollow profile connection is carried out by additional local forming, preferably by means of one or a plurality of crimps.

Method Step e)

In method step e), the insertion of a hollow profile base element containing (a) supporting element(s) into the at least one cavity of the injection moulding or pressing tool takes place.

In addition to the configuration of a hollow profile base element to be provided in method step b) and in addition to the configuration of a supporting element to be provided in method step c) and its respective cross-sectional shape(s), the configuration of an injection moulding or pressing tool to be provided in method step a) is therefore equally important so that the method according to the invention, more particularly the insertion and sealing of the injection moulding or pressing cavity, will be problem-free.

The insertion of the hollow profile base element into the cavity, in contrast to the prior art, therefore takes place without an accompanying expansion thereof. The sealing of the seam between the hollow profile base element and the cavity of the moulding tool, which is connected to the hollow profile base element section provided with applied plastic, takes place only by shape modification of the circumference of the hollow profile base element, wherein the circumference itself remains unchanged.

In the case of use of hollow profile base elements with a round circumference, these are preferably changed into an elliptical shape. In the case of use of hollow profile base elements with and elliptical circumference, their shape is preferably modified to form a round circumference.

The ratio of the circumference of the hollow profile base element to the internal circumference of the tool cavity of the moulding tool is preferably in the range of 1:1 to 1.1:1. It is exceptionally surprising to the person skilled in the art that even in the case of a tolerance-related excess in the circumference of the hollow profile base element relative to the internal circumference of the tool cavity, the gap or the seam remains securely closed and is thus sealed for the injection moulding process, and that excess material resulting from this tolerance-related excess is not pressed into the separating levels of the injection moulding tool. This property of the method according to the invention, the shape modification of the hollow profile base element on closing of the moulding tools, and thus simultaneously the sealing of the tool cavity with respected to the external surface of the hollow profile base element allow directly following and locally limited application of the plastic to the hollow profile, here presented as method step g) and thus in contrast to the prior art without any additionally required method step, resulting in significantly shorter cycle times.

Preferably, an injection moulding or pressing tool to be used according to the invention as well as a hollow profile base element to be used according to the invention have the following features so that the latter can be used to insert without force a hollow profile base element with all of its dimensional and shape tolerances into the pressing or injection moulding tool prepared in method step a):

I. The injection moulding or pressing tool must be configured such that on closing of the tool, it seals off the injection moulding or pressing cavities from the areas of the hollow profile base element in which no application of plastic will take place. For this purpose, contact surfaces in the injection moulding or pressing tool are required at the axial ends of the injection moulding or pressing cavities that press the hollow profile base element during closing of the tool from its hollow profile base element external dimension C to tool dimension A, which at the same time causes the hollow profile base element external dimension D to change to tool dimension B.

II. In an embodiment, the contact surfaces of the at least two tool halves with the hollow profile base element in the injection moulding or pressing tool are configured such that the hollow profile base element is additionally pressed beyond the extent described in L into a mould by a range of −0.01 to −1% of tool dimension A and tool dimension B.

III. The contact surfaces of the at least two tool halves in the injection moulding or pressing tool mentioned in I. and II. comprise the hollow profile base element when the tool is closed over its entire circumference and preferably have a width, i.e., an extension viewed in the axial direction of the hollow profile base element, in the range of 1.0 to 10.0 mm.

IV. In an embodiment, the contact surfaces of the at least two tool halves with the hollow profile base element in the injection moulding or pressing tool are configured such that these areas in the tool constitute hardened inserts.

V. Preferably, the injection moulding or pressing tool must have a clearance around the hollow profile base element between its contact surfaces outside the injection moulding or pressing cavities. This clearance preferably is or lies in the range of 1.0 to 10.0 mm.

Preferably, the hardened inserts used in IV, have a Rockwell hardness in the range of 50 to 62 HRC. This hardness thus lies in the range of conventional bending and punching tools.

See: https://de.wikipedia.org/wiki/Rockwel_(Einheit).

Method Step f)

In method step f), the closing of the injection moulding or pressing tool and the pressing of the hollow profile base element in the closing direction of the at least one cavity take place. The pressing in the closing direction of the at least one cavity preferably takes place locally at the site(s) where the axial ends of the at least one supporting element are located. Particularly preferably, the pressing also takes place at the contact surfaces lateral to the injection moulding or pressing cavity/cavities described under method step e), thus sealing the injection moulding or pressing cavity/cavities.

During the closing of the injection moulding or pressing tool, the hollow profile base element is lightly pressed against the at least one supporting element and the hollow profile base element is made into the shape predetermined by the injection moulding or pressing tool.

By means of the contact surfaces in the injection moulding or pressing tool described under method step e), in method step f), the hollow profile base element is clearly held in position in its cavity, and the cavities provided on the hollow profile for the injection moulding or pressing are sealed.

For closing the injection moulding or pressing tool, a pressing force is required that presses the hollow profile base element into a new shape defined by the configuration of the cavity of the injection moulding or pressing tool, just as a closing force is required for the injection moulding process in order to seal off the at least one cavity. The amount of the pressing force depends on the shape of a hollow profile base element prepared in method step b) and the shape of the supporting element(s) prepared in method step c). Moreover, the configuration, dimensioning, and material properties of the hollow profile base element and the supporting element(s) are of decisive importance for advance calculation of the pressing force to be applied, which must be taken into consideration by the person skilled in the art in designing the process according to the invention.

The strength of the closing force of the injection moulding or pressing tool depends on the projected areas of the intended plastic overmoulding or plastic pressing on application of the plastic that will be required in order to injection mould or press the corresponding plastics in method step g).

In an embodiment, the pressing force to be applied is less than the closing force of the injection moulding method.

According to the invention, the pressing in method step f) preferably continues until the following applies: hollow profile base element external dimension C=tool dimension A. This dimension always applies when the tool is completely closed. No tolerances arise in this case.

Particularly preferably, the pressing in method step f) continues until the following applies: hollow profile base element external dimension C=tool dimension A and hollow profile base element external dimension D=tool dimension B. In this case, the cavity is circumferentially sealed with respect to the hollow profile base element.

In the event that the hollow profile base element external dimension C or D is too small and the deformation by means of the tool is not sufficient to achieve the result of hollow profile base element external dimension D=tool dimension B, a gap would remain. In this case, the tolerances of the hollow profile base element must be selected such that this case does not occur.

If the hollow profile base element external dimension A is set too large, the hollow profile base element external dimension D will reach tool dimension B before the tool is completely closed, which leads to tangential compression of the hollow profile base element wall. In this case as well, the tolerances of the hollow profile base element are to be selected such that the compression occurs at most until compressing strain is exerted on the material, but no deflection of the hollow profile base element wall into the hollow space between the separating surfaces of the of the injection moulding or pressing tool takes place.

Method Step g)

In method step g), plastic is applied in the form of a melt to the outer wall of the hollow profile base element and deformation of the hollow profile base element takes place due to the injection pressure or pressing force. Preferably, plastic application is carried out only in the area, i.e., locally, of the at least one supporting element positioned in the hollow profile base element and deformation of the hollow profile base element by the injection pressure or pressing force takes place only in the area of the at least one supporting element positioned in the hollow profile base element. Preferably, the area of a supporting element is determined by its dimensions in addition to an area of up to 1 cm beyond them. The deformation is a direct result of the injection or pressing forces to be used for the plastic application. How pronounced the deformation is depends on the amount of pressure and the wall thickness as well as the wall material of the hollow profile base element, and on the configuration of a supporting element positioned in the interior of the hollow profile base element or the extent and size of the wall surface not supported by the supporting element. In the case of a plurality of similar supporting elements, and provided that the pressure along the hollow profile base element is sufficiently high and virtually identical, the same forming can always take place along the hollow profile base element. The shape limitation of the forming is determined by the supporting element(s).

In addition, the pressures, temperatures and volumes of plastic application to be used in method step g) also depend on the plastic materials to be used and the geometry of the cavity/cavities to be filled with plastic, which must be taken into consideration in advance by the person skilled in the art is designing the process according to the invention.

By means of the pressing of the hollow profile base element in f), more particularly by means of the tool contact surfaces described in method step e), a seal is achieved during closing of the injection moulding or pressing tool to prevent leakage of the plastic applied in g) between areas of the hollow profile base element in the interior of the tool cavity that have and do not have plastic applied. In an embodiment, the tool contact surfaces are configured such that these areas in the tool constitute hardened inserts.

The embodiment of hardened tool inserts described in method step e) under section IV serves in method step f) and in method step g) to reduce wear on the tool contact surfaces, as these are the only contact sites between the injection moulding or pressing tool and the hollow profile base element and hardened tool inserts preferably are significantly harder than the material of the hollow profile base element.

During local application of plastic to the hollow profile base element in method step g), the at least one supporting element inside the hollow profile base element builds up sufficient counterpressure to the pressure exerted by the tool contact surfaces on the external wall of the hollow profile base element and thus seals the tool contact surfaces or the cavity against any plastic material that may leak out.

The application of plastic to the at least one hollow profile base element preferably takes place in method step g) by injection moulding or compression moulding, more particularly by injection moulding.

Injection Moulding

According to DIN 8580, production methods for the production of geometric solid bodies are classified into 6 main groups. Injection moulding is main group 2, classified under primary forming. It is particularly well-suited for mass-produced articles. There is little or no reworking required in injection moulding, and even complicated shapes and contours can be produced in one operation. Injection moulding as a production method in plastic processing is known in principle to the person skilled in the art;

See: https://de.wikipedia.org/wiki/Spritzgie%C3%9Fen.

In injection moulding, an injection moulding machine is used to liquify or plasticize the plastic to be processed and then inject it under pressure into a mould, the injection moulding tool. In the tool, the material returns to a solid state due to cooling or a crosslinking reaction and is removed after opening of the tool as a finished component. The hollow space or the cavity of a tool determines the shape and surface structure of the solidified applied plastic in the final product, in the present invention the composite component. Injection moulding can today be used to produce products ranging in weight from a few tenths of a gram to the order of 150 kg.

Injection moulding, more particularly extended special methods, allows a virtually free choice of shape and surface structure, more particularly smooth surfaces, grains for contact-friendly areas, patterns, engravings, and colour effects. Together with the economic benefit, this makes injection moulding the most widespread method in the world for mass production of plastic components in virtually every field.

An injection moulding machine comprises at least the following components: 1. screw 2. filling hopper 3. granulate 4. plasticisation cylinder 5. heating element 6. tool.

The steps that take place inside an injection moulding machine are 1. plasticizing and dosing, 2. injection, 3. re-pressing and cooling, and 4. demoulding.

1. Plasticizing and Dosing

The thermoplastic trickles in the form of a granulate into a rotating screw. The granulate is conveyed in the direction of the screw tip and heated and melted by the heat of the cylinder and the friction heat generated by cutting and shearing of the material. The melt accumulates before the screw tip, as the outlet nozzle is initially closed. As the screw is axially movable, it moves back under the pressure and screws itself out of the mass like a corkscrew. The backward movement is braked by a hydraulic cylinder or electrically, so that a back pressure builds up. This back pressure, in combination with the screw rotation, condenses and homogenizes the plastic to be injected as injection moulding material.

The screw position is measured, and as soon as a sufficient amount of injection moulding material for the workpiece volume has accumulated, the dosing process is completed and the screw rotation is stopped. The pressure on the screw is also actively or passively relieved so that the melt is decompressed.

2. Injection

In the injection phase, the injection unit is moved towards the closing unit, pressed against the outlet nozzle, and the screw is subjected to pressure from the rear. In this process, the melt is forced under high pressure, preferably at a pressure in the range of 500 to 2000 bar, through the opened outlet nozzle, and the sprue or sprue system of the injection moulding tool is pressed into the shape-determining hollow space. A non-return valve prevents the melt from flowing back in the direction of the filling hopper.

During injection, an attempt is made to achieve the most laminar flow behaviour possible of the melt. In other words, the melt is immediately cooled in the injection moulding tool at the site where it comes into contact with the cooled tool wall, solidifies, and remains "glued" there. The onrushing melt is pressed through the thus narrowed melt channel at an even greater rate of speed and with even more shear deformation, and at the melt front it is elongated and deformed toward the edge. There is overlapping heat discharge via the tool wall and heat supply due to shear heating. The high injection speed produces a shear rate in the melt that causes the melt to flow more easily. Rapid injection is not desired, as high shear rates can lead to increased molecular degradation. The surface of the injection-moulded product, its appearance, and finally the orientation status of the plastic molecules are also affected by the injection phase.

3. Follow-Up Pressing and Cooling

As the tool is colder than the plastic mass, the tool preferably has a temperature in the range of 20 to 120° C., the plastic mass preferably has a temperature in the range of 200 to 300° C., and the melt cools off in the mould and solidifies on reaching the solidification point of the respectively used plastic, preferably the thermoplastic or the thermoplastic-based compound.

Compounding is a term from plastics technology that is to be taken as a synonym for plastic formulation and describes the refining process of plastics by mixing in of aggregates (fillers, additives etc.) for targeted optimization of the profile of properties. Compounding preferably takes place in extruders and comprises the process operations of feeding, melting, dispersing, mixing, degassing, and pressure buildup. See: https://de.wikipedia.org/wiki/Compoundierung. A compound therefore refers to a thermoplastic or dumplast mixed with fillers or additives.

Cooling of the respectively used plastic on reaching the solidification point is accompanied by a decrease in volume, which adversely affects the dimensional stability and surface quality of the product to be produced, in the present invention, the plastic element to be produced in method step g) that connects in a positive-locking manner to the exterior of the hollow profile base element. In order to partially compensate for this decrease, a reduced pressure is maintained even after filling of the mould so that plastic material can flow in and compensate for the decrease. This supplementary addition of plastic material can continue until the sprue has solidified.

After follow-up pressing of plastic material is completed, the outlet nozzle can be closed, and the plasticizing and dosing process for the next moulded part can begin. The plastic material in the mould cools back down during the remaining cooling period until the inner area, the liquid core of the applied plastic, is solidified, and sufficient rigidity for demoulding has been achieved. This process is also referred to as solidification and takes place according to the invention for the plastic application in method step h).

The injection unit can then be moved back into place by the closing unit, as no more plastic can be discharged from the sprue. This prevents any heat transition from the warmer outlet nozzle to the colder sprue.

4. Demoulding

For demoulding of an injection-moulded product, or the hollow profile base element to which plastic has been applied in method step i) according to the invention, the cavity opens, and the product is ejected through pins that penetrate into the cavity and either falls downward (bulk material) or is removed from the injection moulding tool by handling devices and deposited in orderly fashion or directly conveyed on for further processing. For this purpose, the injection moulding or pressing tool is preferably provided with an ejector side.

The sprue must ether be removed by means of separate processing or is automatically separated during demoulding. Sprueless injection moulding is also possible with hot runner systems, in which the sprue system is constantly maintained at a temperature above the solidification temperature of the plastic, preferably thermoplastics, duroplasts, or compounds, to be used and the material obtained is can thus be used for the next shot.

Compression Moulding

Compression moulding belongs to the family of the forming processes. Compression moulding is a production method for plastics, suitable for slightly curved or flat components. The main field of use of this method is the automobile industry, in which it is used for production of larger components having a two-dimensional or simple three-dimensional structure, more particularly engine hoods, fenders, spoilers or tailgates. Both duroplasts and thermoplastics can be processed.

At the beginning of the compression moulding method, the moulding composition to be processed is introduced into the provided heated cavity. Next, the cavity is closed using a pressure piston. The pressure causes the moulding composition to assume the shape predetermined by the tool. In the case of duroplasts, the temperature serves to affect the hardening process, and in the case of thermoplastics, it serves to melt the plastic. After cooling, the finished product can be removed from the moulding tool and optionally subjected to post-processing or further processing.

The compression moulding method is primarily suitable for medium piece quantities, as in this case the tool costs are generally lower than, for example, in injection moulding. Compression moulding can also be used for the production of fibre composite materials, among others for the production of fibre-reinforced plastics.

See: https://de.wikipedia.org/wiki/Formpressen

A known compression moulding method for thermoplastics is primarily the D-LFT (direct long fibre thermoplastic moulding) method. A particularly elegant D-LFT method is described in DE-A 43 30 860.

Known compression moulding methods for duroplasts are primarily the SMC (sheet moulding compound) method and the BMC (bulk transfer moulding compound) method. A SMC method is described for example in EP 1386721 A1. With respect to BMC methods, see: Handbuch Spritzgießen [Injection Moulding Handbook], ISBN 978 3 446 15632 6, $1^{st}$ Edition, 2001, pp. 1022-1024, Carl Hanser Verlag.

Plastics

In injection moulding or extrusion moulding methods according to the invention for plastic application in method step g), the plastics to be used are preferably thermoplastics or duroplasts, particularly preferably thermoplastics.

Preferred thermoplastics are polyamides (PA), polybutylene terephthalate (PBT), polyethylene terephthalate (PET), polyethylene (PE), polypropylene (PP) and polyvinylchloride (PVC). Particularly preferably, polyamide or polyester is used as a hollow profile base element to be used according to the invention. A polyamide 6 is preferably used as a polyamide. Polybutylene terephthalate (PBT) or polyethylene terephthalate, more particularly PBT, is preferably used as polyester. Preferred duroplasts are epoxy resins, crosslinkable polyurethanes or unsaturated polyester resins.

The thermoplastic or duroplast is preferably used in the form of a compound.

Particularly preferably, the plastic to be applied in method step g) is produced from a thermoplastic with at least one filler or reinforcing material. Glass fibres are preferably used as a filler or reinforcing material. Particularly preferably, the filler or reinforcing materials are used in amounts in the range of 0.1 to 85 parts by mass per 100 parts by mass of the thermoplastic. Even more preferably, glass fibres are used as a filler or reinforcing material. Particularly preferably, filler or reinforcing materials are used in amounts in the range of 15 to 60 parts by mass per 100 parts by mass of the thermoplastic.

Particularly preferably, an applied plastic composed of a glass fibre-reinforced polyamide 6 with 15 to 60 parts by mass of glass fibres per 100 parts by mass of polyamide is used in the injection moulding process. Such compounds are available under the trade name Durethan® from Lanxess Deutschland GmbH, Cologne.

Alternatively, the melt of a plastic to be applied in method step g) can also be produced from a duroplast. Epoxy resins, crosslinkable polyurethanes and unsaturated polyester resins are preferably used in this case.

Particularly preferably, the application of a plastic in method step g) is carried out using a duroplast with at least one filler or reinforcing material. In this case, glass fibres or carbon fibres are preferably used as a filler or reinforcing material.

Particularly preferably, 10 to 50 parts by mass of glass fibres or carbon fibres per 100 parts by mass of the duroplast are used as a filler or reinforcing material.

Depending on the spacial configuration of a supporting unit positioned inside the at least one hollow profile base element, the dimension of the wall thickness of the hollow profile base element and the section of the material of the hollow profile base element, in an embodiment of the present invention in method step g), local deformations, preferably crimps, can form due to the injection pressure of the injection moulding process or the pressing force of the extrusion moulding process in the thin wall of the hollow profile base element. These deformations or crimps can have an additional positive effect on the strength of the connection of the hollow profile base element to the plastic element to be externally applied to the hollow profile base element.

The degree of deformation in the case of the local deformations, preferably in the form of crimps, produced in the hollow profile base element wall in method step g) is limited by the elongation at rupture of the respective material of the hollow profile base element in an embodiment of the present invention. If this degree of deformation is exceeded, this may result in tearing of the hollow profile base element wall. However, the elongation can be limited by controlling the injection or pressing forces during plastic application, or, however, by means of the configuration of the negative mould of the supporting element, by preventing or limiting excessive deformation, i.e. of the material, in the sense of limitation of the path/deformation. Deformation likewise depends on the material composition and the thickness of the hollow profile base element wall.

The more pronounced the deformation of the hollow profile base element wall, the more the two connection partners—the hollow profile base element and the applied plastic component—engage with each other, and the more they form a non-detachable positive-locking connection and can only be separated form each other by destroying them. In addition to the application of plastic, therefore, the purpose of method step g) should also be to take maximum advantage of the extensibility of the respective material of the hollow profile base element wall, but not to exceed the elongation at rupture.

In the case of thermoplastic as the material of the hollow profile base element or the hollow profile base element wall, local heating of the hollow profile base element can take place at least precisely at the position or at the sites where the local application of plastic to the hollow profile base element in the form of a melt occurs only in the area of the at least one supporting element positioned in the hollow profile base element. This measure allows the elongation at rupture of the material to be increased.

Method Step h)

In method step h), cooling of the plastic application or plastic overmoulding, also referred to as solidification, takes place. The term solidification describes the solidification of the molten plastic applied in method step g) by cooling or chemical crosslinking to a solid element. In the case of simultaneous shaping, in this manner, functional elements, structures and surfaces can be directly applied to the hollow profile base element.

In an embodiment of the present invention and in the case of the crimps described in method step g), after solidification of the plastic melt on the external surface of the hollow profile base element, preferably a metal tube, plastic application takes place in the form of a closed plastic ring with a structured internal surface that exactly constitutes the positive image of the crimp structure of the outer wall of the hollow profile base element, preferably the metal tube.

A shear-rigid, shear-resistant, stress-resistant and positive-locking connection according to the invention has now been achieved around the external wall of the hollow profile base element, preferably around the external wall of the hollow profile base element in the form of a metal tube.

Further details on method step h) were described above in the section "Follow-up pressing and cooling".

Method Step i)

In method step i), the finished composite component is removed from the injection moulding or pressing tool after, due to solidification of plastic melt, the pressure in the applied plastic is no longer present and the pressing and closing force has been reduced by closing of the tool. Further details were already described above in the section "Demoulding".

Composite Component

According to the invention, composite components to be produced are preferably used in a corresponding configuration in motor vehicle construction, more particularly automobile construction. Here, the components are preferably body parts, more particularly a so-called cross car beam (CCB), also referred to as a cross car structural beam. Cross car structural beams are known for example from U.S. Pat. No. 5,934,744 A or U.S. Pat. No. 8,534,739 B.

In composite components according to the invention, the hollow profile base element and the plastic element applied by means of a plastic melt in method step g) are mutually stiffened and reinforced. Moreover, the plastic elements applied in method step g) to the external wall of the hollow profile base element also serve to achieve functional integration in the sense of system or module formation for connection of the plastic structures or plastic surfaces.

Preferred embodiments of a composite component to be produced according to the invention show either crimps or similar deformations and/or bores or similar openings in the hollow profile base element.

The invention therefore preferably concerns a composite component in which the wall of the hollow profile base element has crimps or similar deformations in the area of the at least one supporting element and the at least one plastic element, The invention also preferably concerns a composite component in which the wall of the hollow profile base element has bores or similar openings in the area of the at least one supporting element and the at least one plastic element.

The invention also preferably concerns a composite component in which the wall of the hollow profile base element has crimps or similar deformations and bores or similar openings in the area of the at least one supporting element and the at least one plastic element.

Particularly preferred embodiments are described in the following:

Embodiment 1

Composite component of a hollow profile base element and at least one plastic element, wherein the hollow profile base element has at least one supporting element inside the hollow profile base element that is positioned at the site where the plastic element completely or partially comprises the hollow profile base element and the hollow profile base element has crimps or similar deformations between the at least one supporting element and the at least one plastic element.

Embodiment 2

Composite component of a hollow profile base element and at least one plastic element, wherein the hollow profile base element has at least one supporting element inside the hollow profile base element that is positioned at the site where the plastic element completely or partially comprises the hollow profile base element and the hollow profile base element has bores or similar openings with plastic injected through them between the at least one supporting element and the at least one plastic element.

Embodiment 3

Composite component of a hollow profile base element and at least one plastic element, wherein the hollow profile base element has at least one supporting element inside the hollow profile base element that is positioned at the site where the plastic element completely or partially comprises the hollow profile base element and the hollow profile base element has crimps or similar deformations and bores or similar openings between the at least one supporting element and the at least one plastic element.

If the at least one supporting element is removed from the interior of the hollow profile base element in subsequent method step j), one obtains corresponding composite components from a hollow profile base element and at least one plastic component connected thereto in a shear-resistant, shear-rigid, and positive-locking manner according to at least one of the above embodiments 1 through 3, but without the supporting element(s).

The present invention is explained below with reference to FIG. 1 through FIG. 9:

FIG. 1 shows the essential components to be provided for a composite component to be produced according to the invention before the injection moulding or pressing process, wherein 1 represents the hollow profile base element, here in the embodiment of a tube with an elliptical cross-sectional shape, and 2 an example of a supporting element adapted according to the internal tube diameter. 4 shows the longitudinal axis of the hollow profile base element 1, 5 the external cross-sectional shape of the supporting element 2 and 6 the internal cross-sectional shape of the hollow profile base element. The external cross-sectional shape 5 is congruent to the internal cross-sectional shape 6.

Figure 2:
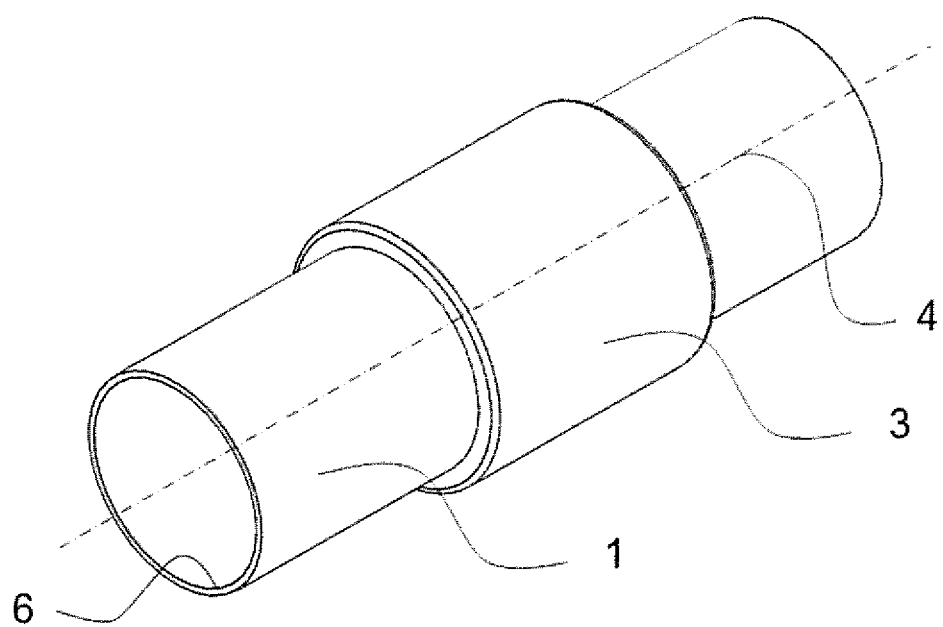

FIG. 2 shows a composite component to be produced according to the invention after the injection moulding or pressing process, wherein 1 represents the hollow profile base element, here in the embodiment of a tube with a round cross-sectional shape, and 3 a plastic element connected in a positive-locking manner to the hollow profile base element. 4 shows the longitudinal axis of the hollow profile base element and 6 the internal cross-sectional shape of the hollow profile base element.

Figure 3:
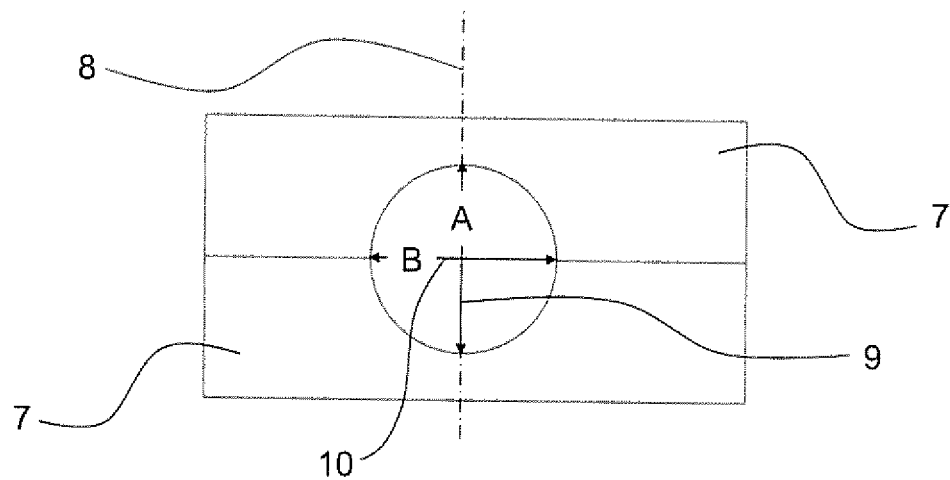

FIG. 3 shows the cross-section of an injection or pressing tool to be used according to the invention 7 in a closed state in the area of the axial ends of a supporting element to be used according to the invention with the opening and closing direction 8. 9 shows tool dimension A of the tool cavity in the area of the axial ends of the supporting element viewed in the closing direction. 10 shows tool dimension B of the tool cavity in the area of the axial ends of the supporting element viewed perpendicular to the closing direction.

Figure 4:
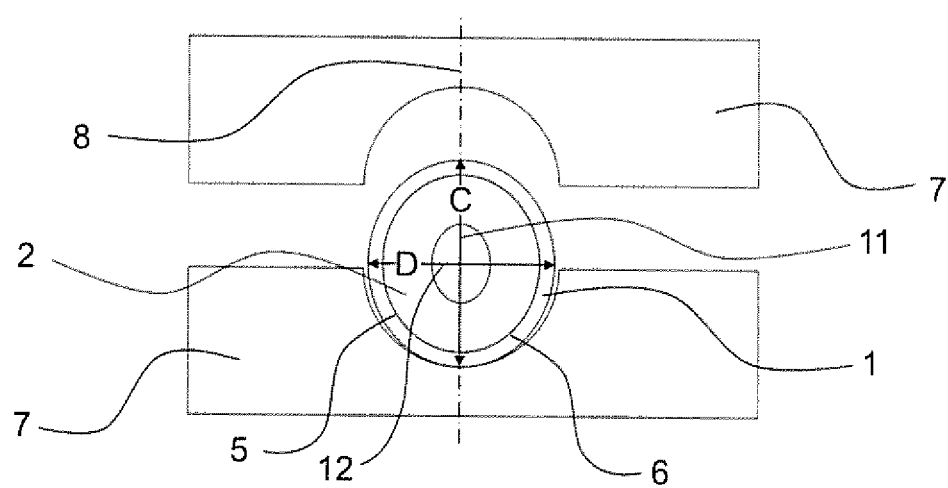

FIG. 4 shows the cross-section of an injection or pressing tool to be used according to the invention 7 in the area of the axial ends of a supporting element 2 with the tool opened and the hollow profile base element 1 inserted and a supporting element 2 positioned therein. 11 shows the external dimension C of the hollow profile base element 1 viewed in the closing direction, 12 shows the external dimension D of the hollow profile base element 1 of the tool cavity in the area of the axial ends of the supporting element viewed perpendicular to the closing direction.

Figure 5:
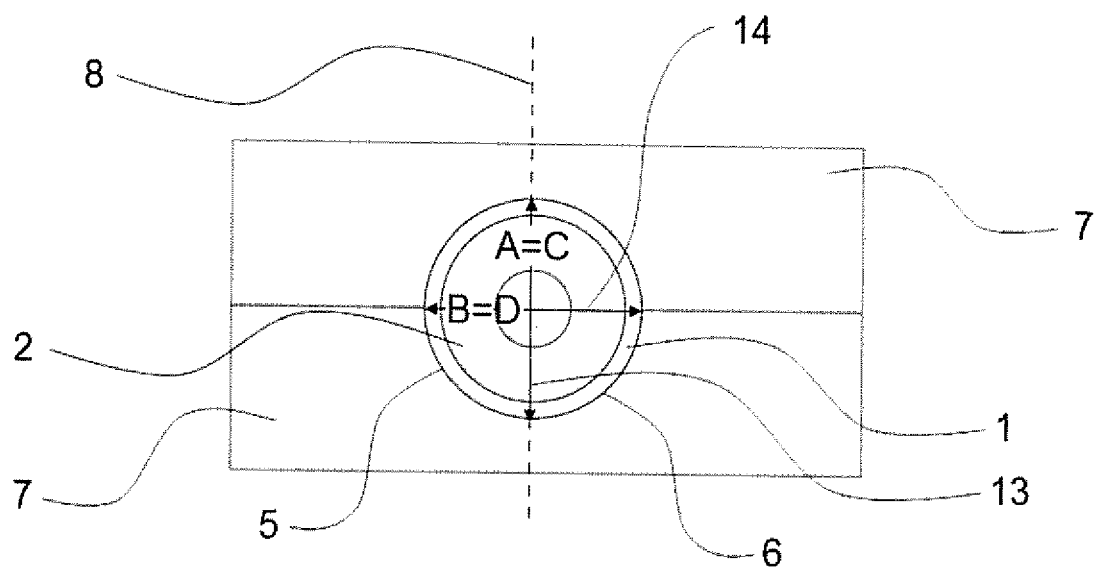

FIG. 5 shows the cross-section of an injection or pressing tool to be used according to the invention 7 (here with two tool halves) in the area of the axial ends of a supporting element 2 in a closed state and with the supporting element 2 containing the hollow profile base element 1. 13 represents the external dimension C of the compressed hollow profile base elements 1 in the area of the axial ends of the supporting element 2 viewed in the closing direction. After pressing, the hollow profile base element external dimension C is equal to the tool dimension A. 14 represents the external dimension C of the compressed hollow profile base element 1 in the area of the axial ends of the supporting element perpendicular to the closing direction. After pressing, tool dimension B is equal to hollow profile base element external dimension D.

Figure 6:
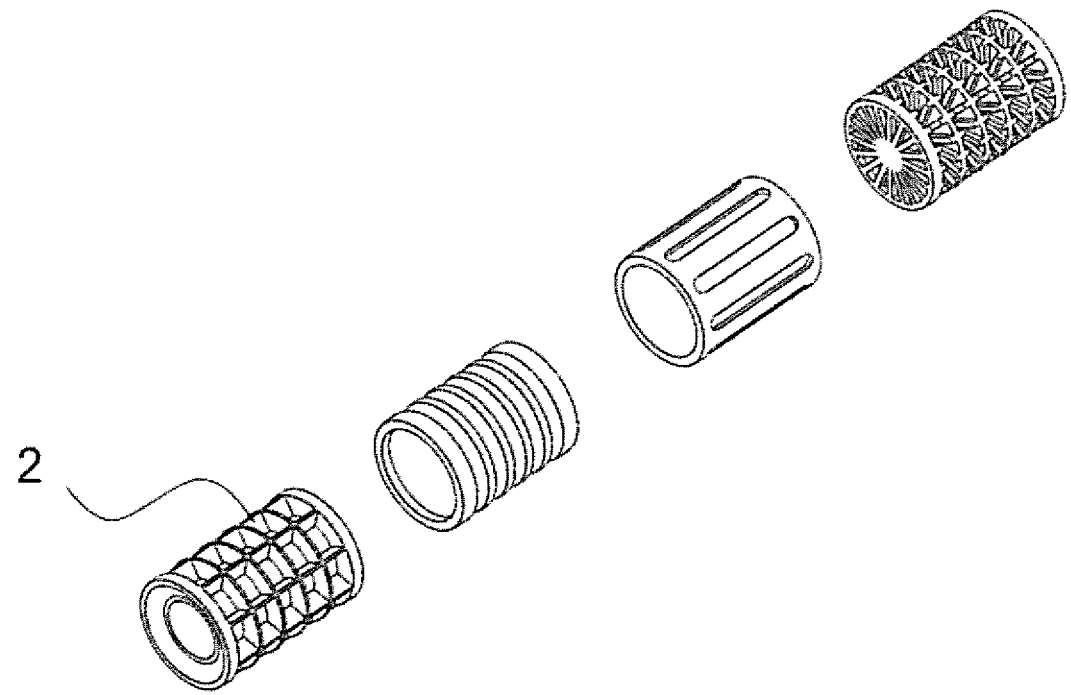

FIG. 6 shows variations of supporting elements to be used according to the invention 2 in elliptical cylinder form that are positioned in the interior of a hollow profile base element in the form of a tube. The supporting elements shown here have a through opening from top to bottom, wherein these supporting elements allow the flow of a fluid through the supporting element in an additional IHPF method that is optionally to be used.

Figure 7:
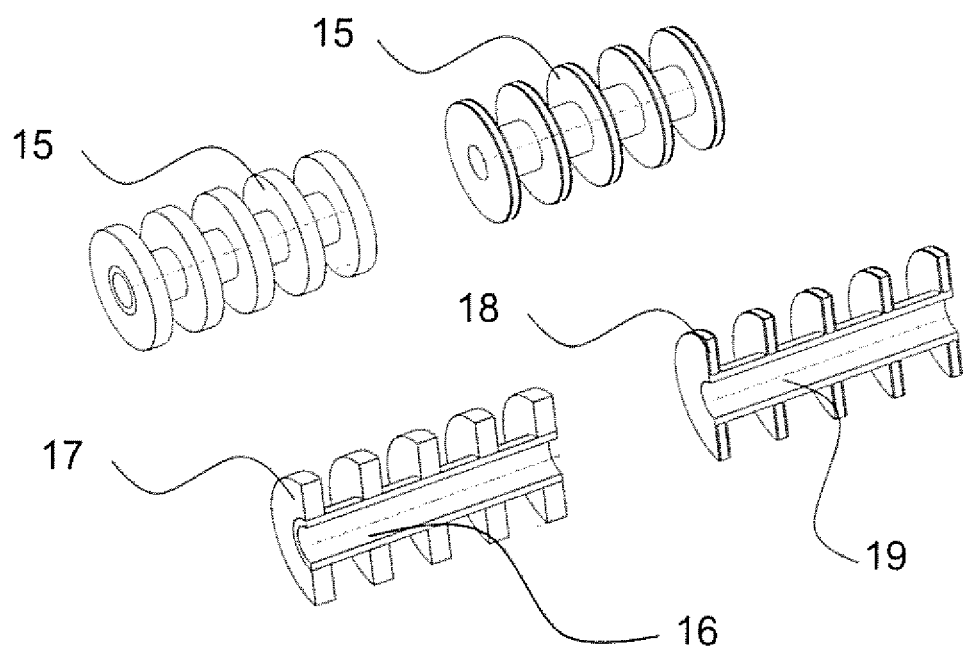

FIG. 7 shows variations of plastic-metal hybrid supporting elements 15 in elliptical cylinder form that are positioned in the interior of a hollow profile base element. In an embodiment, the supporting elements shown here have a cylindrical metal tube 16 with moulded-on plastic ribs 17, and in an alternative embodiment, a plurality of metallic discs 18 with a cylindrical plastic tube 19 in the center that connects the metallic disc to a uniform supporting element.

Figure 8:
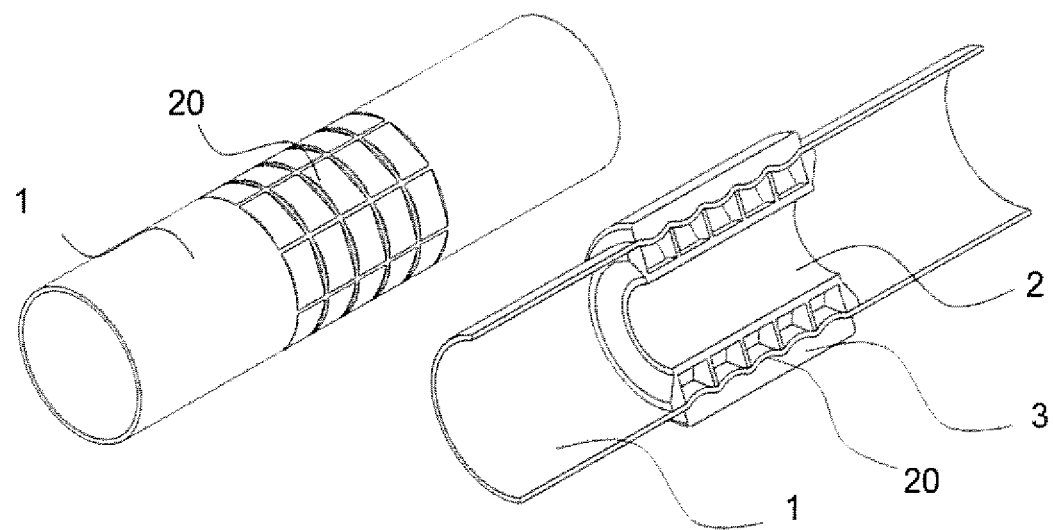

FIG. 8 shows in the left image a composite component of the invention according to the above-described Embodiment 1, wherein the wall of the hollow profile base element 1 shows structuring predetermined by the structure of the supporting element 2 crimps 20, and wherein the plastic element 3 has been removed. After completion of the method, the original elliptical shape of the hollow profile base element has assumed a round shape. The right image shows a composite component according to the invention along its longitudinal axis in cutaway form with an internal supporting element 2 that remains in the hollow profile base element 1 even after mechanical removal of the plastic element 3.

Figure 9:
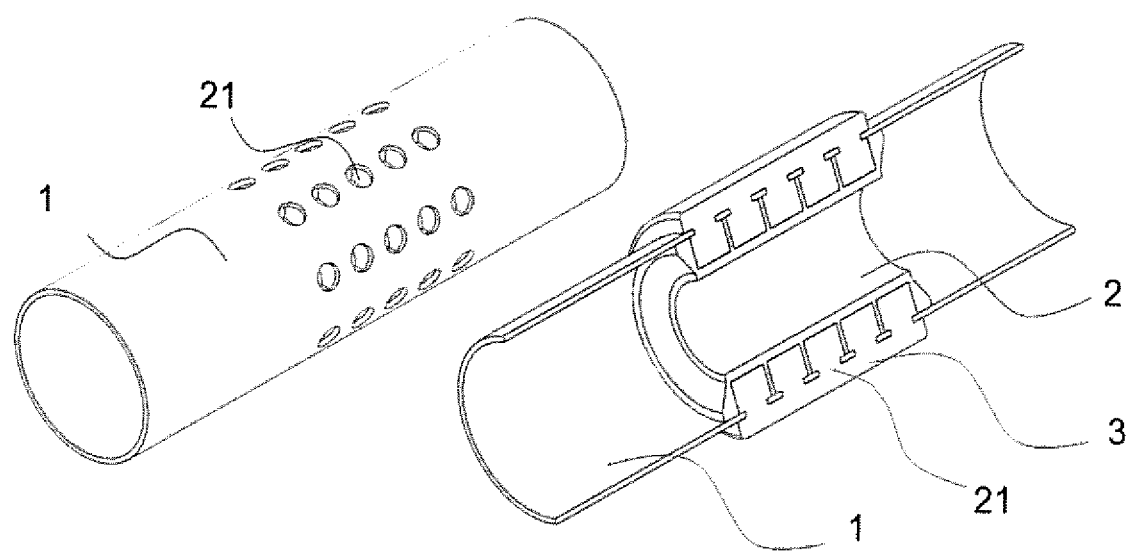

FIG. 9 shows an alternative embodiment to FIG. 8 of a hollow profile base element 1 in the form of a tube with a plurality of bores 21, and in a cutaway view, a supporting element 2 fixed by plastic application 3 to the external wall of the hollow profile base element. Here, the plastic has penetrated through the bores into predetermined areas of the supporting element 2 and is hardened or solidified therein. FIG. 9 thus constitutes a composite component according to the above-described Embodiment 2.

Figure 10:
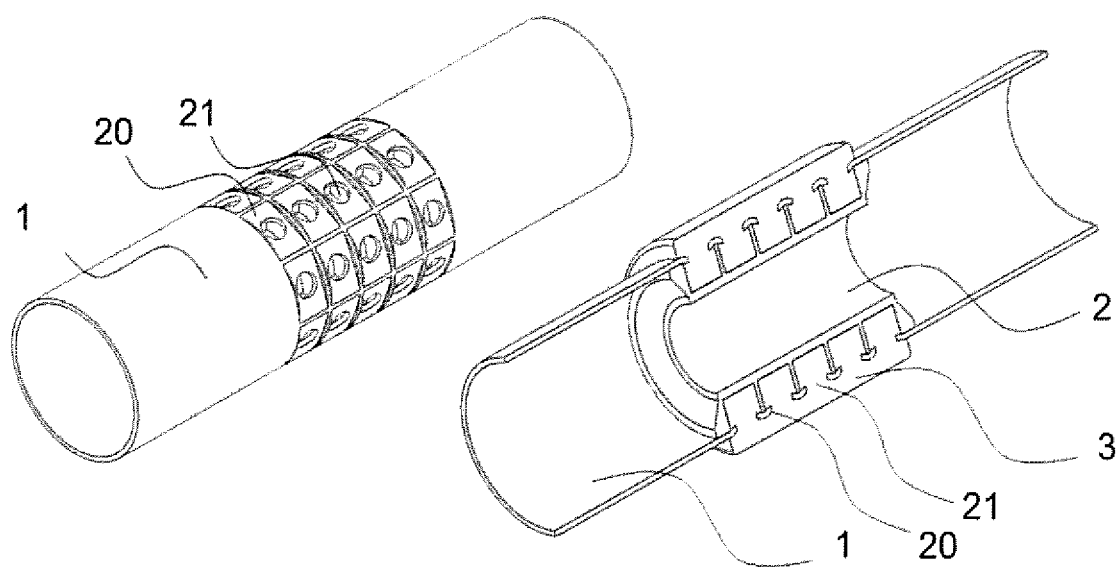

FIG. 10 shows a composite component according to the invention according to the above-described Embodiment 3, wherein the hollow profile base element 1 with an internal supporting element 2 and an applied plastic element 3 has both a plurality of crimps 20 and a plurality of bores 21.

It will be understood that the specification and examples are illustrative but not limitative of the present invention and that other embodiments within the spirit and the scope of the invention will suggest themselves to those skilled in the art.

What is claimed is:

1. A method for the production of a composite component, the method comprising:

positioning at least one supporting element inside of least one hollow profile base element at at least one site within the at least one hollow profile base element where an application of plastic will take place on the corresponding outside of the at least one hollow profile base element, wherein an external dimension or external cross-sectional shape of the at least one supporting element congruently corresponds to an internal dimension or internal cross-sectional shape of the hollow profile base element, inserting the hollow profile base element containing the at least one supporting element into a cavity of an injection moulding or pressing tool, wherein:

the tool has at least a first portion and a second portion defining the cavity therebetween, at least one of first and second portion is movable in a movement direction towards and away from the other portion, the tool has a tool dimension A in the movement direction and a tool dimension B perpendicular to the movement direction, the hollow profile base element defines:

a longitudinal axis, an external dimension C perpendicular to the longitudinal axis and greater than tool dimension A by 0.1 to 5%, and an external dimension D perpendicular to both the longitudinal axis and C and is smaller than tool dimension B by 0.1 to 5%, moving the at least one of the first portion and the second portion towards the other portion and pressing of the hollow profile base element in the movement direction, applying plastic in the form of a melt externally to the hollow profile base element within the cavity and deforming the hollow profile base element by the injection pressure or pressing force, cooling the plastic melt applied to the hollow profile base element to form a composite component, and removing the finished composite component from the injection moulding or pressing tool.

2. The method according to claim 1, further comprising, during or after positioning of the at least one supporting element inside of the at least one hollow profile base element, forming at least one crimp from outside into the wall of the hollow profile base element in the area of the at least one supporting element.

3. The method according to claim 1, further comprising forming at least one hole into the wall of the hollow profile base element in the area of the at least one supporting element.

4. The method according to claim 1, further comprising, during or after positioning of the at least one supporting element inside of the at least one hollow profile base element, forming at least one hole, into the wall of the hollow profile base element in the area of the at least one supporting element, preferably at the exact position of the at least one supporting element.

5. The method according to claim 1, further comprising, after positioning of the at least one supporting element inside of the at least one hollow profile base element and before inserting the hollow profile base element into the cavity, depositing at least one plastic melt volume in at least one cavity provided for this purpose in the injection moulding tool or pressing tool, wherein moving the at least one of the first portion and the second portion towards the other portion locally compresses and presses the plastic melt volume from outside against the wall of the hollow profile base element and simultaneously against the at least one supporting element positioned in the hollow profile base element, or pressed around the hollow profile base element.

6. The method according to claim 1, further comprising, after cooling of the plastic melt, in the case of a metallic hollow profile base element, subjecting the hollow profile base element to an additional internal high pressure method to change the shape of the hollow profile base element at sites where there is no supporting element and no polymer application.

7. The method according to claim 1, further comprising, after removing the composite from the tool, in the case of a hollow profile base element of plastic, subjecting the hollow profile base element to an additional blow-moulding process for changing the shape of the hollow profile base element at sites where there is no supporting element and no plastic application.

8. The method according to claim 1, further comprising, after removing the composite from the tool, applying additional bending forces to the hollow profile base element t at sites where there is no supporting element and no plastic application to deform the hollow profile base element at at least one position.

9. The method according to claim 1, further comprising, after positioning of the at least one supporting element inside of the at least one hollow profile base element and before inserting the hollow profile base element into the cavity, applying bending forces to the hollow profile base element to deform the hollow profile base element at at least at one position.

10. The method according to claim 8, further comprising applying additional bending forces to deform the hollow profile base element if the final component requires a shape that deviates from that of a straight hollow profile base element.

11. The method according to claim 10, wherein the hollow profile base element is deformed both at sites where a supporting element is located inside the hollow profile base element and at sites where no supporting element is located inside the hollow profile base element.

12. The method according to claim 1, further comprising applying a surface treatment to the outer wall of the hollow profile base element to support connection of the hollow profile base element and the moulded-on plastic by blocking all degrees of freedom, translationally in X, Y and Z directions and rotationally about X, Y, and Z axes.

13. The method according to claim 12, wherein the surface treatment is out applied before or after positioning of the at least one supporting element inside the hollow profile base element and prior to insertion of the hollow profile base element into the cavity.

14. The method according to claim 13, wherein the surface treatment comprises at least one of: application of at least one bonding agent, plasma surface activation, laser structuring, chemical pre-treatment, and an additive application process.

15. The method according to claim 14, wherein the chemical pretreatment comprises an additive application method comprising applying acids or bases by means of a thermal metal injection moulding application process.

16. The method according to claim 1, wherein the pressing of the hollow profile base element takes place locally in the movement direction at positions or sites where the axial ends of the at least one supporting element positioned in the hollow profile base element are located.

17. The method according to claim 1, wherein the external application of plastic is carried out in a locally limited manner in the area of the at least one supporting element positioned in the hollow profile base element and the deformation of the hollow profile base element by the injection pressure or pressing force takes place only in the area of the at least one supporting element positioned in the hollow profile base element.

18. The method according to claim 1, wherein the at least one hollow profile base element has a diameter and a wall thickness wherein a ratio of the diameter to the wall thickness is 5:1 to 300:1.

* * * * *